United States Patent [19]

Hsiung et al.

[11] 4,199,451

[45] Apr. 22, 1980

[54] SPLIT FLOW WATER TREATMENT PLANT

[75] Inventors: Andrew K. Hsiung; George F. Eaton, both of Corvallis, Oreg.

[73] Assignee: Neptune Microfloc, Inc., Corvallis, Oreg.

[21] Appl. No.: 968,088

[22] Filed: Dec. 11, 1978

[51] Int. Cl.² .............................................. B01D 21/01
[52] U.S. Cl. ..................... 210/86; 210/260; 210/305; 210/319; 210/521
[58] Field of Search ............... 210/252, 259, 260, 205, 210/206, 207, 208, 295, 319, 521, 522, 86, 104, 263, 305

[56] References Cited

U.S. PATENT DOCUMENTS

| | | | |
|---|---|---|---|
| 2,242,652 | 5/1941 | Maxwell | 210/319 |
| 3,399,135 | 8/1968 | Conley, Jr. et al. | 210/83 |
| 3,482,695 | 12/1969 | Hanson et al. | 210/86 |
| 3,741,401 | 6/1975 | Hsiung | 210/521 |
| 3,837,501 | 9/1974 | Pielkenrood | 210/522 |
| 3,898,164 | 8/1975 | Hsiung | 210/521 |
| 4,132,651 | 1/1979 | de Jay | 210/522 |

Primary Examiner—Theodore A. Granger
Attorney, Agent, or Firm—Klarquist, Sparkman, Campbell, Leigh, Hall & Whinston

[57] ABSTRACT

A split flow water treatment plant includes a settling basin comprising a pair of banks of generally horizontally extending settling tubes and an inlet baffle comprising a plurality of parallel vertical perforated sheets upstream of and adjacent to each of the banks. An inclined diverting plate extends from the downstream end of the lowermost tube in the first of the banks to the upper upstream end of the inlet baffle adjacent the second bank. The distribution of flow between the banks may be regulated by an adjustable weir or by water level control.

3 Claims, 4 Drawing Figures

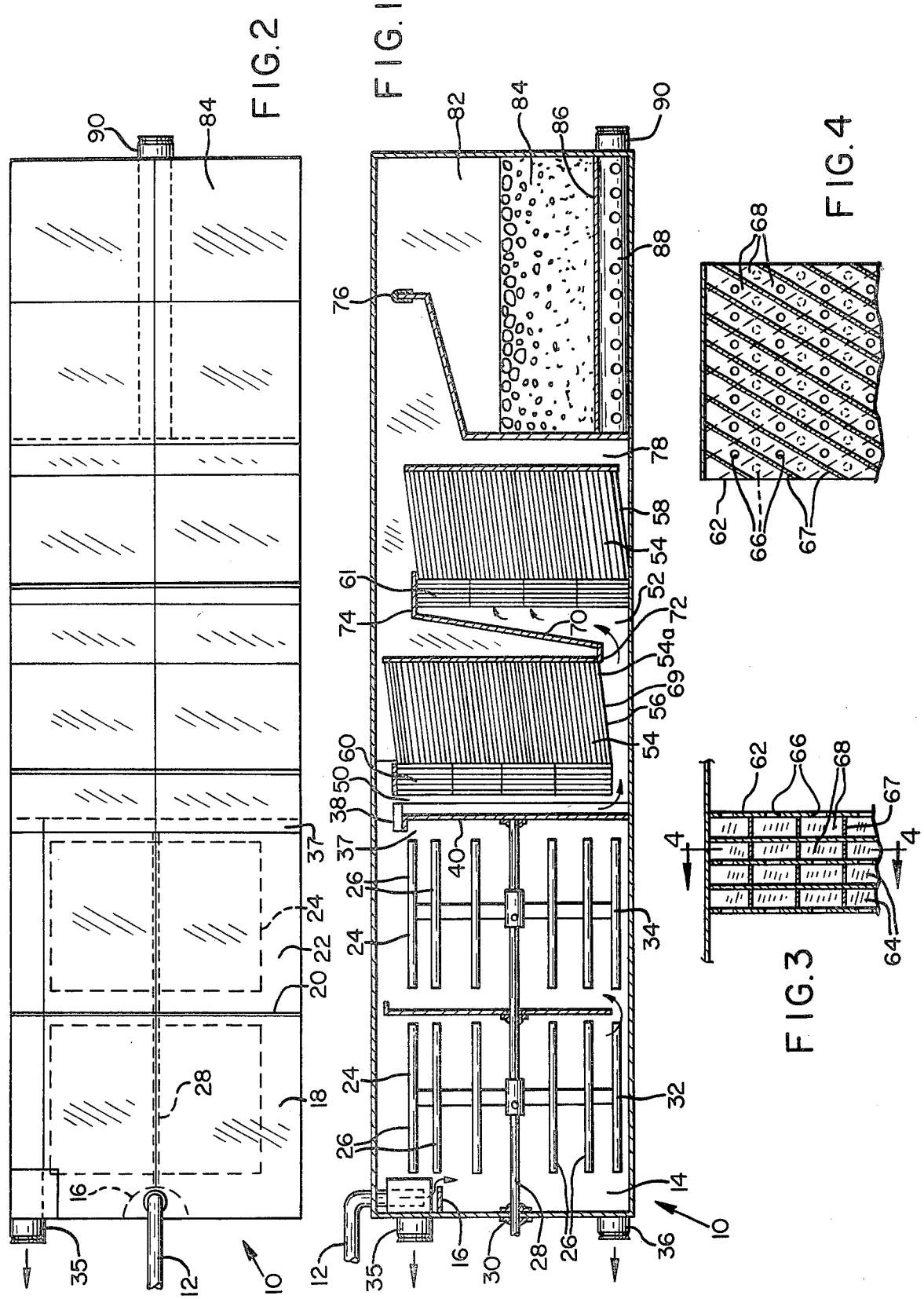

SPLIT FLOW WATER TREATMENT PLANT

BACKGROUND OF THE INVENTION

This invention relates to improvements in water treatment plants and, more particularly, to improvements in such plants utilizing tubular settling devices that settle the water at low Reynolds number flows. The invention is applicable to both water and wastewater treatment.

Packaged water and wastewater treatment plants have found ready acceptance by small communities, motels, recreational areas and the like. The plants can be operated with a minimum of operator control. When used for providing potable drinking water, they are able to provide high clarity water on a fail-safe basis.

A packaged water treatment plant of the above type is disclosed in Hansen et al, U.S. Pat. No. 3,482,695. The plant therein disclosed utilizes a settling means comprising a plurality of small diameter tubes which permit settling of settleable material in a short period of time before passing the water through a filter. The water passes through the tubes at a low Reynolds number flow, the velocity being sufficiently low to provide streamlined laminar flow through the tubes.

The plant comprises means to achieve rapid coagulant chemical dispersion and automatic pH control, mechanical flocculation, a settling basin comprising the settling tubes as above described, filter means and the necessary plant and process controls. A tank is provided for receiving the filtered water and means are provided automatically to pump water from the tank back through the filter and the settling means when backwashing becomes necessary, thereby simultaneously to backwash the two.

A problem arises with plants of the above type, however, when it is desired to increase their capacity. Often the allowable width of the plant is restricted, although it is possible to increase the length. Furthermore, problems sometimes arise in achieving a uniform distribution of the water through all of the settling tubes. The tubes function more efficiently if the flow through each of the tubes is substantially the same.

Accordingly, it is an object of the present invention to provide a water treatment plant of the foregoing type that will permit more cost-effective design configurations and provide treated water in larger capacities than has heretofore been possible.

It is a further object of the present invention to provide such a plant that can be used in both package treatment plants of the foregoing type and also in large plants, and which will be applicable to both water and waste water treatment.

It is a further object of the present invention to provide such a plant when there are restrictions on its allowable width.

It is a still further object of the present invention to provide such a plant with improved flow distribution through the tubes in the settling basin such that the flow through each will be substantially more uniform than has heretofore been possible, thereby to increase settling efficiency.

SUMMARY OF THE INVENTION

The water treatment plant of the present invention includes means for flocculating an influent flow of water to be treated and tubular settling means for settling the flocculated influent at a flow velocity sufficiently low to provide substantially laminar flow therethrough. Filtration means are included for filtering the water received from the tubular settling means.

The settling means comprises a settling basin including a pair of longitudinally horizontally spaced plenums and at least one bank of generally horizontally extending settling tubes disposed between the plenums. The tubes have a total cross-sectional area such that for a predetermined maximum flow rate through the plant, the velocity through each tube will be such as to maintain streamlined, laminar flow therein. Settleable material in the water entering the tubes settles out of the water and deposits upon the bottoms of the tubes as the water passes therethrough.

An inlet baffle is positioned upstream of and adjacent the bank of tubes. The baffle comprises a set of spaced apart, generally parallel vertical sheets having a plurality of perforations therein, the sheets forming a set of vertical channels therebetween.

The influent flow of water in the first of the pair of plenums impinges on the first vertical sheet in the inlet baffle and thereafter flows, in a direction perpendicular to the first sheet, through the perforations therein to pass into the first one of the set of vertical channels. Thereafter, the flow passes through the perforations in the others of the sheets sequentially to the last one thereof. The flow then enters the bank of horizontal tubes. The baffle facilitates achieving a uniform flow distribution across the mouths of the tubes and thus, substantially the same flow through each of the tubes themselves.

Adjacent vertical sheets in the baffle are joined by sets of inclined planar members to form inclined compartments in the vertical channels, the sets of planar members in adjacent vertical channels being inclined in opposed directions to form a rigid truss-like structure. The inclined planar members provide a settling surface for settleable particles which settle out of the water as it passes through the baffle. A generally horizontally extending plate is disposed beneath the baffle to collect these settled particles.

Preferably, the plant of the present invention is provided with two or more banks of settling tubes, with an inlet baffle as above described positioned upstream of and adjacent each one. An inclined diverting plate extends from the downstream end of the lowermost tube in the first of such banks to the upper upstream end of the inlet baffle adjacent the second of such banks to divide the flow between the banks.

A weir may be positioned at the effluent side of the second bank of tubes for regulating the distribution of flow between the banks.

DETAILED DESCRIPTION OF THE DRAWINGS

FIG. 1 is a longitudinal section view through a water treatment plant in accordance with the present invention.

FIG. 2 is a top plan view of the settling basin shown in FIG. 1.

FIG. 3 is an enlarged sectional view through the baffle.

FIG. 4 is a view on line 4—4 of FIG. 3.

DETAILED DESCRIPTION OF PREFERRED EMBODIMENT

Referring to the drawings and in particular to FIGS. 1 and 2, a water treatment plant 10 of the type disclosed in the aforementioned U.S. Pat. No. 3,482,695 treats raw water delivered through an inlet pipe 12 by a pump (not shown) or by gravity head. Means are provided for adding treatment chemicals to assist in the removal of such undesired materials as manganese or iron, or chemicals for reducing hardness, or the usual chemicals for forming flocs to assist in the removal of suspended or colloidal materials, or color bodies. Such chemicals are allowed to mix in the inlet pipe 12 prior to entering the plant 10.

The thus chemically treated raw water is then introduced into a flocculation chamber 14, impinging first on a splash plate 16. The influent is agitated in a first section 18 of chamber 14 and then passes underneath a separation baffle 20, located at the middle of chamber 14, into a second section 22 thereof for final agitation. Mixing and turbulence is imparted to the water by a two-part agitator 24, which may comprise a plurality of paddles 26 attached to a horizontal shaft 28 which rotates in guide bearings 30. The paddles 26 are positioned such that one group 32 agitates the water in the first section 18 of chamber 14, while a second group 34 agitates the water in the second section 22. The shaft 28 is turned by a fractional horsepower gear head motor (not shown) supported exteriorly of chamber 14 and adapted to provide an angular velocity to the agitator 24 sufficient to promote the necessary floc growth. The turbulence produced by the paddles 26 aids in agglomerating the flocculated turbidity particles to increase their mass and hence, their settling velocity. An overflow pipe 35 and a drain 36 are provided for chamber 14 as shown.

The thus flocculated water then flows from the downstream end 37 of the flocculation chamber 14 over a weir 38 positioned atop the downstream wall 40 of chamber 14 into a first receiving plenum 50 of a settling basin 52 comprising a plurality of generally horizontally extending settling tubes 54 arranged in two banks 56, 58 as shown. About one-half of the total plant flow goes through each of the two banks. The tubes 54 are sufficient in number such that the entire flow through the plant passes through them at a velocity sufficiently low to provide substantially laminar flow through the tubes, thereby to permit the majority of the suspended matter to be removed therein by gravity separation. The tubes 54 typically are of a length of between about three and six feet, such that the passage time therethrough is between about five and ten minutes. Although the tubes may be inclined at any angle from zero to sixty degrees from the horizontal, preferably, they are but slightly elevated in the direction of flow therethrough. Tubes of the type preferred are more particularly described in Conley et al, U.S. Pat. No. 3,399,135. The short settlement time of five to ten minutes is in contrast to most water treatment plants where considerably longer settling periods are required, typically, 30 minutes to an hour.

As described in the aforementioned U.S. Pat. No. 3,399,135, settleable material in the water entering the tubes settles out of the water and deposits upon the bottoms of the tubes 54 as it passes therethrough.

The first bank 56 of settling tubes is positioned higher in basin 52 than is the second bank 58, thereby to provide an entrance for part of the flow to pass through the second bank 58.

An inlet baffle 60, 61 is positioned upstream of and adjacent to each of the banks 56, 58 of settling tubes. As shown in FIGS. 3 and 4, each such inlet baffle 60, 61 comprises a set of spaced apart, generally parallel perforated vertical sheets 62 forming vertical channels 64 therebetween. The sheets 62 may be made of any rigid or semi-rigid material and may, for example, comprise 0.01 inch calendared ABS plastic. The perforations 66 therein are preferably about 1 inch in diameter and are spaced vertically and horizontally in staggered (zig-zag) or other configurations approximately 2 inches center to center. A preferred spacing between sheets 62 is about 2 inches. In a preferred construction we use six to eight inches of such baffle construction adjacent each bank 56, 58 (four or five sheets 62). Inflow kinetic energy can dissipate rapidly within a few inches of baffle construction.

Adjacent vertical sheets 62 in the baffles 60, 61 are joined by sets of inclined planar members 67 which are attached to adjacent ones of the sheets 62 to form inclined compartments 68 in the vertical channels 64. The members 67 are preferably made of 0.025 inch ABS plastic extruded channels inclined to the horizontal at an angle of about 45° to about 75°. The members 67 are attached at right angles to the vertical sheets 62, the members 67 in each of the vertical channels 64 forming a set, the sets in adjacent vertical channels 64 being inclined in opposed directions, thereby to form a rigid truss-like structure which has substantial structural strength so as to be self-supporting. The inclined members 67 provide a settling surface for settleable particles which settle out of the water as it passes through the baffles 60, 61. Construction of the inlet baffles 60, 61 is more particularly described in Hsiung U.S. Pat. No. 3,898,164.

A generally horizontally disposed plate 69 is positioned beneath each inlet baffle 60, 61 and its associated bank of settling tubes 54. The perforations 66 provide a passageway for the stream which flows in the longitudinal direction through each inlet baffle 60, 61 and the inclined members 67 provide the settling surface for the solids which settle out in the primary settlement of the influent water which occurs. The plates 69 are necessary to collect particles which settle out of the influent flow.

An inclined diverting plate 70 extends transversely across the settling basin 52 and from the downstream end 72 of the lowermost tube 54a in the first bank 56 to the upper upstream end 74 of the inlet baffle 61 adjacent the second bank 58. An adjustable flow regulating weir 76 may be positioned at the effluent side of the second bank 58 for regulating the distribution of flow between the banks. Raising the height of weir 76 reduces the flow through bank 58 and diverts more of the flow through bank 56. Conversely, lowering the height of weir 76 increases the flow through bank 58 and reduces the flow through bank 56. The same result can be achieved by water level control.

Flow passing through the first bank 56 together with flow passing through the second bank 58 discharges into a second plenum 78 from which the effluent is allowed to spill over weir 76 into a chamber 82 containing a filter 84.

Use of the two banks 56, 58 of settling tubes 54 achieves several significant advantages in the construction of the plant 10. Firstly, in situations where the width of the tank is restricted, use of the two banks of tubes permits construction of a plant of greatly increased capacity merely by extending the length thereof. Use of the two banks also simplifies tank construction in cases of desired increased capacity, thereby to result in appreciable savings in cost. Also, use of the inlet baffles 60, 61 adjacent each of the banks 56, 58 achieves a better flow distribution across the mouths of the settling tubes 54. This results in substantially the same flow through each of the tubes 54 with resulting improved plant performance. This also significantly reduces the cost of a plant for any given flow capacity. If the flow through each of the tubes 54 is the same as it is through each of the other tubes, more consistent performance is achieved and this accordingly, results in improved efficiency.

The filter 84 preferably comprises filter media of coarse to fine particle gradation in the direction of liquid flow. Such a filter may comprise materials of such size and density such that upon backwashing, the filter particles will become deposited in a desired orientation. More preferably, such a filter comprises a bed having intermixed media wherein there is an increasing number of particles for a given cross-section in the direction of fluid flow. The coarse particles of filter media predominate near the top of the filter 84, the medium-sized particles predominate in the center region thereof, and the finer particles predominate in the lower region thereof, all as more particularly described in U.S. Pat. No. 3,343,680, "Filter and Method of Making Same". The size of particles in a filter of the type described generally ranges from 0.1 mm to 1.5 mm. The filter media is supported within the chamber 82 on an underdrain structure 86. The filter 84 separates from the water the residual particulate matter or floc not removed in the banks of settling tubes 54, the floc being entrapped in the media thereof. Filtered water collects in a plenum chamber 88 beneath the structure 86 and is discharged through a pipe 90.

In the illustrated embodiment, the second plenum 78 is enlarged by positioning the weir 76 in the center of the filter chamber 82. During backwash this causes the backwash water to travel from both ends of the filter 84 towards the center before it spills over weir 76 and into the settling basin 52, thereby to improve backwashing performance.

In the foregoing description, the invention has been described with reference to a certain particular preferred embodiment, although it is to be understood that the specific details shown are merely illustrative and that the invention may be carried out in other ways without departing from the true spirit and scope of the following appended claims.

We claim:

1. In a water treatment plant comprising a container, inlet means to introduce an influent flow of water into said container to be treated therein, tubular settling means in said container for settling the water at a flow velocity sufficiently low to provide substantially laminar flow through said tubular settling means, filtration means in said container and downstream of said tubular settling means for filtering the water received from said tubular settling means, and discharge means for discharging water received from said filtration means, a settling basin containing said tubular settling means, said settling basin comprising:
   a pair of longitudinally horizontally spaced plenums;
   a pair of banks of generally horizontally extending settling tubes disposed in said settling basin between said plenums, one of said banks being downstream of the other, said tubes having a total cross-sectional area such that for a predetermined maximum flow rate through the plant, the flow velocity through each tube will be such as to maintain substantially laminar flow therein, whereby settleable material in the water entering said tubes may settle out of said water and deposit upon the bottoms of said tubes as it passes therethrough from one of said pair of plenums to the other thereof;
   an inlet baffle positioned upstream of and adjacent to each of said banks of generally horizontally extending settling tubes, each of said inlet baffles comprising
   a set of spaced apart, generally parallel vertical sheets having a plurality of perforations therein, said sheets forming a set of vertical channels therebetween,
   the flow of water impinging on a first one of said vertical sheets and thereafter flowing, in a direction perpendicular to said first sheet, through said perforations therein and passing into the first one of said set of vertical channels and thence through the perforations in the others of said sheets sequentially to the last one thereof, said flow then entering the adjacent bank of generally horizontally extending settling tubes, the kinetic energy in said water dissipating rapidly as said flow passes through said baffles,
   said inlet baffles providing uniform flow distribution across the mouths of said settling tubes in said banks to facilitate uniform flow therethrough; and
   an inclined diverting plate extending from the downstream end of the lowermost tube in the first of said banks to the upper upstream end of the inlet baffle adjacent the second of said banks, said plate dividing the influent flow of water between said banks.

2. The water treatment plant of claim 1, further comprising a weir disposed in said container at the effluent side of said second of said banks for regulating the distribution of flow between said banks.

3. The water treatment plant of claim 2, in which said weir is positoned centrally of said filtration means.

* * * * *